US006993428B1

(12) United States Patent
Gundrum

(10) Patent No.: US 6,993,428 B1
(45) Date of Patent: Jan. 31, 2006

(54) DETECTING LEAKAGE OF ENGINE EXHAUST GAS USING EXHAUST MASS FLOW MEASUREMENT

(75) Inventor: Timothy J. Gundrum, Wheaton, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/946,750

(22) Filed: Sep. 22, 2004

(51) Int. Cl.
*G01F 1/684* (2006.01)

(52) U.S. Cl. ...................................... 701/114; 73/118.1

(58) Field of Classification Search ..................... None
See application file for complete search history.

(56) References Cited

U.S. PATENT DOCUMENTS 4,399,698 A * 8/1983 Hiromasa et al. .......... 73/118.1
5,708,585 A * 1/1998 Kushion ..................... 701/108

OTHER PUBLICATIONS

Ganseman, Chris and Joe Griffin, “EGR Mass Flow Sensor”, EPIQ Sensor-Nite, Jan. 29, 2002 and Feb. 11, 2002.

* cited by examiner

*Primary Examiner*—Andrew M. Dolinar
(74) *Attorney, Agent, or Firm*—Dennis Kelly Sullivan; Susan L. Lukasik; Jeffrey P. Calfa

(57) ABSTRACT

An internal combustion engine has cylinders within which combustion occurs and an exhaust system through which products of combustion are exhausted from the cylinders. A temperature sensor and an electric heater are disposed in temperature sensing relation to the exhaust gas flow. A processor develops temperature data obtained from the temperature sensor, and power data representing power required to heat the electric heater to a temperature in excess of temperature of exhaust gas flow past the heater. The processor processes the temperature data, the power data, and data representing mass flow through the engine upstream of the temperature sensor and heater according to an algorithm for yielding data representing difference between mass flow of exhaust gas past the temperature sensor and heater and mass flow upstream of the temperature sensor and heater. The measurement may then be used to measure leakage from the exhaust system by subtracting it from flow measurement in a different location.

26 Claims, 1 Drawing Sheet

DETECTING LEAKAGE OF ENGINE EXHAUST GAS USING EXHAUST MASS FLOW MEASUREMENT

FIELD OF THE INVENTION

This invention relates generally to internal combustion engines that propel motor vehicles and have exhaust systems that include exhaust gas treatment devices. In particular the invention relates to the measurement of the mass flow of engine exhaust gas and the further use of that measurement for the purpose of measuring exhaust gas leakage from the exhaust system.

BACKGROUND AND SUMMARY OF THE INVENTION

Exhaust gas treatment devices in the exhaust systems of internal combustion engines that propel motor vehicles prevent significant amounts of undesired products of combustion from being emitted to the surrounding atmosphere. For assuring full effectiveness whatever after-treatment device or devices is or are present in an exhaust system, it is important for integrity of the exhaust system to be assured.

The present invention is directed to a system that includes devices for placement in an engine exhaust system to obtain measurements of certain physical characteristics of exhaust gas flowing through the exhaust system and processing equipment for processing data related to exhaust gas flow past those devices to yield data representing the mass flow of exhaust gas through the exhaust system.

The invention further relates to processing the exhaust mass flow data with data representing mass flow introduced into engine combustion chambers for combustion to yield data indicative of any leakage from the exhaust system upstream of the devices placed in the exhaust system.

The invention still further relates to obtaining the exhaust mass flow data both upstream and downstream of an exhaust gas treatment device and processing the obtained data to yield data indicative of any leakage from the exhaust gas treatment device.

By monitoring for leakage in such ways, compliance with any relevant laws and/or regulations can be proven. Alternatively, detection of leakage can be signaled, enabling early correction of a leak.

Principles of the invention can be embodied in an engine by the exposure of two devices to exhaust gas flow, in conjunction with suitable algorithms in on-board processing apparatus, such as apparatus present in a processor-based engine control system.

One of the two devices comprises a sensor having the capability for accurately sensing exhaust gas temperature. The other device comprises an electric heater having the capability to be heated to a temperature in excess of exhaust gas temperature. By using an existing exhaust gas sensor as the other device, the invention can be cost-effectively implemented in a motor vehicle.

Execution of an algorithm that processes temperature data provided by the sensor and power data representing power required to maintain heater temperature yields data representing mass flow through the exhaust system past the temperature sensor and the electric heater.

Execution of a further algorithm that processes the exhaust mass flow data and data obtained from mass flow measuring apparatus that measures mass flow entering the engine for combustion yields data representing any leakage in the exhaust system occurring upstream of the exhaust system sensor and heater.

Principles of the invention can also be embodied in an engine by the exposure of a first pair of the two devices to exhaust gas flow upstream of an exhaust gas treatment device and a second pair of the two devices downstream of the exhaust gas treatment device, in conjunction with suitable algorithms in on-board processing apparatus, and processing data obtained through use of the four devices to yield data representing any leakage from the exhaust gas treatment device.

Accordingly, one general aspect of the present invention relates to a method of measuring mass flow of exhaust gas through an exhaust system of an internal combustion engine. The method comprises developing temperature data representing temperature of exhaust gas flowing past a temperature sensor disposed in temperature sensing relation to the exhaust gas flow, and developing power data representing power required to heat an electric heater disposed in heat exchange relation with the exhaust gas flow to a temperature in excess of temperature of exhaust gas flow past the heater. The temperature data and the power data are then processed according to an algorithm for yielding data representing mass flow of exhaust gas.

Another general aspect relates to an engine that embodies the method just described.

Still another general aspect of the invention relates to a method of measuring leakage of exhaust gas from an exhaust system of an internal combustion engine. The method comprises developing temperature data representing temperature of exhaust gas flowing past a temperature sensor disposed in temperature sensing relation to the exhaust gas flow, and developing power data representing power required to heat an electric heater disposed in heat exchange relation with the exhaust gas flow to a temperature in excess of temperature of exhaust gas flow past the heater. A processor processes the temperature data, the power data, and data representing mass flow through the engine upstream of the temperature sensor and heater according to an algorithm for yielding data representing the difference between mass flow of exhaust gas past the temperature sensor and heater and mass flow upstream of the temperature sensor and heater.

Another general aspect relates to an engine that embodies the method just described.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

DESCRIPTION OF THE PREFERRED EMBODIMENT

Figure 1:
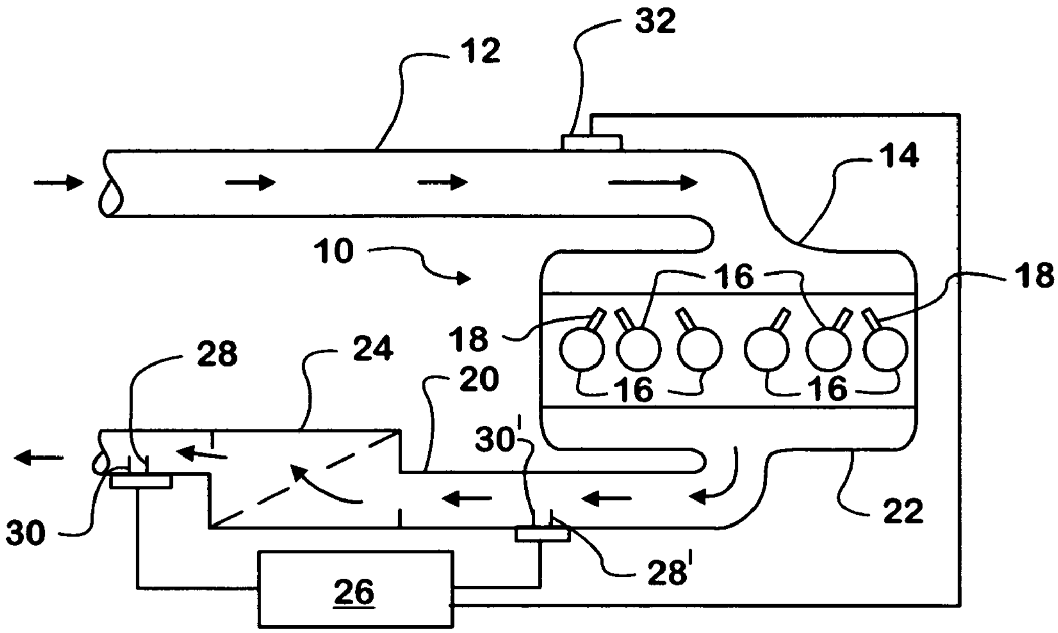
FIG. 1 shows a general schematic diagram of an engine having an exhaust system containing devices used in practice of the present invention.
Figure 2:
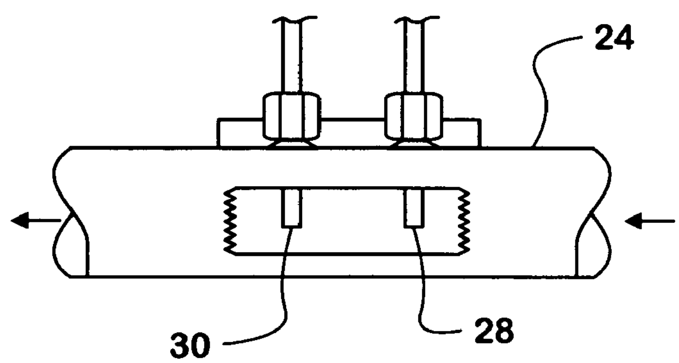
FIG. 2 is more detailed view of the portion of the engine exhaust system showing placement of devices used in a representative implementation of the invention.

FIG. 1 illustrates general elements of a multi-cylinder internal combustion engine 10 that powers a motor vehicle. An example of such a vehicle and engine is a truck having a fuel-injected diesel engine.

Engine 10 comprises an intake system 12, including an intake manifold 14, through which charge air is delivered to engine cylinders 16. Charge air enters each engine cylinder 16 from manifold 14 via a corresponding intake valve or valves. Individual fuel injectors 18 inject diesel fuel into individual engine cylinders in properly timed relation to engine operation.

Engine 10 also comprises an exhaust system 20, including an exhaust manifold 22, for conveyance of exhaust gases created by combustion within cylinders 16 from the engine. Exhaust gases pass out of each cylinder 16 via a respective exhaust valve or valves into exhaust manifold 22. From manifold 22 the exhaust gases pass through piping to an exhaust gas treatment system 24 that contains one or more treatment devices.

An electronic engine control 26 that possesses digital processing capability is associated with engine 10. Control 26 may comprise one or more processors that process data from various input data sources in accordance with one or more programmed algorithms to provide control of various functions associated with operation of engine 10 and/or provide certain information about engine operation. Certain data processed by control 26 represents variables and may originate at external sources (input variables) and/or be generated internally of control 26 (local variables). Other data may be programmed into and stored in control 26 for processing by algorithms.

In accordance with principles of the invention, data representing the temperature of the exhaust gas passing through exhaust system 22 after treatment by treatment system 24 is provided by a temperature sensor 28. An electric heater 30 is placed in the exhaust system proximate sensor 28 for obtaining additional data. Heater 30 can be the heater of an exhaust gas sensor present in the exhaust system.

Control 26 acts via suitable electric circuitry to control the delivery of electric current to heater 30 such that heater 30 is heated to a temperature in excess of exhaust gas temperature flowing past the heater. The flow of exhaust gas past heater 30 tends to cool the heater. In order to maintain heater temperature, control 26 must regulate the electric current flow through heater 30.

For a constant exhaust gas flow rate, less electric current is needed to maintain heater temperature as exhaust gas temperature rises, and more current is needed as exhaust gas temperature falls. For a constant exhaust gas temperature, less electric current is needed to maintain heater temperature as exhaust gas flow rate decreases, and more current is needed as exhaust gas flow rate increases.

Because current flow through heater 30 correlates with power input to the heater, and because power input to the heater correlates with mass flow rate of exhaust gas, a measurement of the current flow to the heater, a measurement of temperature of exhaust gas flow, and knowledge of the heater temperature collectively provide sufficient data for obtaining a measurement of mass flow rate of exhaust gas. Where the current flow is regulated in such a manner as to maintain a known heater temperature, data representing that known temperature may be used as knowledge of the heater temperature. Where the current flow is not necessarily regulated in such a manner, a measurement of heater temperature must be obtained to provide the knowledge of the heater temperature.

Processing of these various pieces of data by control 26 is performed using appropriate algorithms to yield mass flow rate of exhaust gas. While heater 30 is proximate sensor 28, it should be placed so that it does not influence the exhaust gas temperature being sensed by sensor 28.

Any leakage from exhaust gas treatment system 24 can be measured by placement of a second pair of devices, namely temperature sensor 28' and electric heater 30', upstream of system 24. Temperature data obtained from sensor 28' and power data representing the power input to heater 30' are processed to yield the upstream exhaust gas flow rate data. The downstream exhaust gas flow rate data is then subtracted from the upstream exhaust gas flow rate data to yield a measurement of any leakage from system 24.

Commercially available devices may be used for sensors 28, 28' and for heaters 30, 30'. Appropriate circuitry interfaces each with control system 26. Heaters 30, 30' can be a heated exhaust gas sensor, such as a NOx sensor, HEGO (Heated Exhaust Gas Oxygen), UEGO (Universal Exhaust Gas Oxygen), or any other sensor which can be heated to temperatures above typical exhaust gas temperatures.

While a presently preferred embodiment of the invention has been illustrated and described, it should be appreciated that principles of the invention are applicable to all embodiments and uses that fall within the scope of the following claims.

The invention claimed is:

1. A method of measuring mass flow of exhaust gas through an exhaust system of an internal combustion engine, the method comprising:

- developing temperature data representing temperature of exhaust gas flowing past a temperature sensor disposed in temperature sensing relation to the exhaust gas flow;
- developing power data representing power required to heat an electric heater disposed downstream of the temperature sensor in heat exchange relation with the exhaust gas flow to a temperature in excess of temperature of exhaust gas flow past the heater; and
- processing the temperature data and the power data according to an algorithm for yielding data representing mass flow of exhaust gas.

2. A method as set forth in claim 1 wherein the step of developing power data includes developing both heater temperature data representing temperature to which the heater is being heated and electric data representing electric input to the heater.

3. A method of measuring leakage of exhaust gas from an exhaust system of an internal combustion engine, the method comprising:

- developing temperature data representing temperature of exhaust gas flowing past a temperature sensor disposed in temperature sensing relation to the exhaust gas flow;
- developing power data representing power required to heat an electric heater disposed in heat exchange relation with the exhaust gas flow to a temperature in excess of temperature of exhaust gas flow past the heater; and
- processing the temperature data, the power data, and data representing mass flow through the engine upstream of the temperature sensor and heater according to an algorithm for yielding data representing difference between mass flow of exhaust gas past the temperature sensor and heater and mass flow upstream of the temperature sensor and heater.

4. A method as set forth in claim 3 wherein the step of developing power data includes developing both heater temperature data representing temperature to which the heater is being heated and electric data representing electric input to the heater.

5. A method as set forth in claim 3 wherein the data representing mass flow through the engine upstream of the temperature sensor and heater is obtained by processing temperature data obtained from a further temperature sensor disposed in temperature sensing relation to the exhaust gas flow upstream of the first-mentioned temperature sensor and first-mentioned heater to develop further temperature data and by developing further power data representing power required to heat a further electric heater disposed in heat exchange relation with the exhaust gas flow upstream of the first-mentioned temperature sensor and first-mentioned heater to a temperature in excess of temperature of exhaust gas flow past the further heater.

6. A method as set forth in claim 5 further including the step of passing the exhaust gas flow through an exhaust gas treatment device that is upstream of the first-mentioned temperature sensor and first-mentioned heater and that is downstream of the further temperature sensor and further heater.

7. A method as set forth in claim 3 wherein the data representing mass flow through the engine upstream of the temperature sensor and heater is obtained from flow entering the engine through an intake system.

8. An internal combustion engine comprising:

engine cylinders within which combustion occurs;

an exhaust system through which products of combustion are exhausted from the cylinders;

a temperature sensor disposed in temperature sensing relation to the exhaust gas flow;

an electric heater disposed downstream of the temperature sensor in heat exchange relation to the exhaust gas flow;

a processor for developing temperature data obtained from the temperature sensor, for developing power data representing power required to heat the electric heater to a temperature in excess of temperature of exhaust gas flow past the heater, and for processing the temperature data and the power data according to an algorithm for yielding data representing mass flow of exhaust gas past the sensor and heater.

9. An internal combustion engine as set forth in claim 8 wherein the processor develops the power data from both heater temperature data representing temperature to which the heater is being heated and electric data representing electric input to the heater.

10. An internal combustion engine comprising:

engine cylinders within which combustion occurs;

an exhaust system through which products of combustion are exhausted from the cylinders;

a temperature sensor disposed in temperature sensing relation to the exhaust gas flow;

an electric heater disposed in heat exchange relation to the exhaust gas flow;

a processor for developing temperature data obtained from the temperature sensor, for developing power data representing power required to heat the electric heater to a temperature in excess of temperature of exhaust gas flow past the heater, and for processing the temperature data, the power data, and data representing mass flow through the engine upstream of the temperature sensor and heater according to an algorithm for yielding data representing difference between mass flow of exhaust gas past the temperature sensor and heater and mass flow upstream of the temperature sensor and heater.

11. An internal combustion engine as set forth in claim 10 wherein the processor develops power data from both heater temperature data representing temperature to which the heater is being heated and electric data representing electric input to the heater.

12. An internal combustion engine as set forth in claim 10 including a further temperature sensor disposed in temperature sensing relation to the exhaust gas flow upstream of the first-mentioned temperature sensor and first-mentioned heater, and a further electric heater disposed in heat exchange relation with the exhaust gas flow upstream of the first-mentioned temperature sensor and first-mentioned heater, and wherein the processor develops data representing mass flow through the engine upstream of the first-mentioned temperature sensor and first-mentioned heater by processing temperature data obtained from the further temperature sensor to develop further temperature data and by developing further power data representing power required to heat the further electric heater to a temperature in excess of temperature of exhaust gas flow past the further heater.

13. An internal combustion engine as set forth in claim 12 further including an exhaust gas treatment device upstream of the first-mentioned temperature sensor and first-mentioned heater and downstream of the further temperature sensor and further heater.

14. An internal combustion engine as set forth in claim 10 further including an intake system through which flow enters the engine and wherein the data representing mass flow through the engine upstream of the temperature sensor and heater is obtained from flow entering the engine through the intake system.

15. A method of measuring mass flow of exhaust gas through an exhaust system of an internal combustion engine, the method comprising:

developing temperature data representing temperature of exhaust gas flowing past a temperature sensor disposed in temperature sensing relation to the exhaust gas flow;

developing power data representing power required to heat an electric heater of an exhaust gas sensor that senses a constituent of the exhaust gas flow and is disposed in heat exchange relation with the exhaust gas flow to a temperature in excess of temperature of exhaust gas flow past the heater; and processing the temperature data and the power data according to an algorithm for yielding data representing mass flow of exhaust gas.

16. A method as set forth in claim 15 wherein the step of developing power data includes developing both heater temperature data representing temperature to which the heater is being heated and electric data representing electric input to the heater.

17. An internal combustion engine comprising:

engine cylinders within which combustion occurs;

an exhaust system through which products of combustion are exhausted from the cylinders;

a temperature sensor disposed in temperature sensing relation to the exhaust gas flow;

an exhaust gas sensor that senses a constituent of the exhaust gas flow and comprises an electric heater disposed in heat exchange relation to the exhaust gas flow;

a processor for developing temperature data obtained from the temperature sensor, for developing power data representing power required to heat the electric heater to a temperature in excess of temperature of exhaust gas flow past the heater, and for processing the temperature data and the power data according to an algorithm for yielding data representing mass flow of exhaust gas past the temperature sensor and heater.

18. An internal combustion engine as set forth in claim 17 wherein the processor develops the power data from both heater temperature data representing temperature to which the heater is being heated and electric data representing electric input to the heater.

19. An internal combustion engine as set forth in claim 17 wherein the exhaust gas sensor comprises a NOx sensor.

20. An internal combustion engine as set forth in claim 17 wherein the exhaust gas sensor comprises a heated exhaust gas oxygen (HEGO) sensor.

21. An internal combustion engine as set forth in claim 17 wherein the exhaust gas sensor comprises a universal exhaust gas oxygen (UEGO) sensor.

22. An internal combustion engine comprising:

engine cylinders within which combustion occurs;

an exhaust system through which products of combustion are exhausted from the cylinders;

a temperature sensor disposed in temperature sensing relation to the exhaust gas flow;

an exhaust gas sensor comprising an electric heater disposed in heat exchange relation to the exhaust gas flow;

a processor for developing temperature data obtained from the temperature sensor, for developing power data representing power required to heat the electric heater to a temperature in excess of temperature of exhaust gas flow past the heater, and for processing the temperature data, the power data, and data representing mass flow through the engine upstream of the temperature sensor and heater according to an algorithm for yielding data representing difference between mass flow of exhaust gas past the temperature sensor and heater and mass flow upstream of the temperature sensor and heater.

23. An internal combustion engine as set forth in claim 22 wherein the processor develops power data from both heater temperature data representing temperature to which the heater is being heated and electric data representing electric input to the heater.

24. An internal combustion engine as set forth in claim 22 including a further temperature sensor disposed in temperature sensing relation to the exhaust gas flow upstream of the first-mentioned temperature sensor and first-mentioned heater, and a further electric heater disposed in heat exchange relation with the exhaust gas flow upstream of the first-mentioned temperature sensor and first-mentioned heater, and wherein the processor develops data representing mass flow through the engine upstream of the first-mentioned temperature sensor and first-mentioned heater by processing temperature data obtained from the further temperature sensor to develop further temperature data and by developing further power data representing power required to heat the further electric heater to a temperature in excess of temperature of exhaust gas flow past the further heater.

25. An internal combustion engine as set forth in claim 24 further including an exhaust gas treatment device upstream of the first-mentioned temperature sensor and first-mentioned heater and downstream of the further temperature sensor and further heater.

26. An internal combustion engine as set forth in claim 22 further including an intake system through which flow enters the engine and wherein the data representing mass flow through the engine upstream of the temperature sensor and heater is obtained from flow entering the engine through the intake system.

* * * * *